United States Patent [19]

Yoshida

[11] Patent Number: 5,212,643
[45] Date of Patent: May 18, 1993

[54] VEHICLE-MOUNTED NAVIGATION APPARATUS

[75] Inventor: Chisato Yoshida, Hyogo, Japan

[73] Assignee: Mitsubishi Denki Kabushiki Kaisha, Tokyo, Japan

[21] Appl. No.: 773,411

[22] Filed: Oct. 9, 1991

[30] Foreign Application Priority Data

Jan. 17, 1991 [JP] Japan .................................. 3-003731

[51] Int. Cl.$^5$ ............................................ G06F 15/50
[52] U.S. Cl. .................................... 364/449; 340/990; 340/995; 73/178 R
[58] Field of Search ....................... 364/443, 444, 449; 73/178 R; 340/988, 990, 995

[56] References Cited

U.S. PATENT DOCUMENTS

| | | | |
|---|---|---|---|
| 4,504,913 | 3/1985 | Miura et al. | 364/449 |
| 4,608,656 | 8/1986 | Tanaka et al. | 364/449 |
| 4,675,676 | 6/1987 | Takanabe et al. | 364/449 |
| 4,689,747 | 8/1987 | Kurose et al. | 364/449 |
| 5,084,822 | 1/1992 | Hayami | 364/443 |

FOREIGN PATENT DOCUMENTS

2024738 12/1971 Fed. Rep. of Germany .
3333176 3/1984 Fed. Rep. of Germany .
3842179 6/1989 Fed. Rep. of Germany .
62-164086 7/1987 Japan .

Primary Examiner—Gary Chin

[57] ABSTRACT

A vehicle-mounted navigation apparatus includes a display control unit which reads road map data from a map data storage device used for storing a plurality of road map data concerning road maps with different reduced scales in accordance with a current position of the vehicle detected by a position detecting unit. The display control unit controls the read road map to be displayed on the screen of a display unit in accordance with a control signal from a touch panel unit and further reads a scale indication pattern from an indication pattern storage device used for storing a plurality of scale indication patterns showing the respective reduced scales corresponding to the stored road maps. The display control unit superimposes the selected scale indication pattern on the selected road map. Since a map with a desired reduction of scale with a desired scale indication pattern corresponding to the scale reduction of the map superimposed thereon can be displayed on the screen, the driver can readily obtain a map with a desired reduction of scale and a scale pattern corresponding to the reduction of scale on the screen, and thereby detection of the real distance can be readily and correctly performed, ensuring a smooth and safe cruising of the vehicle.

9 Claims, 6 Drawing Sheets

F I G . 4
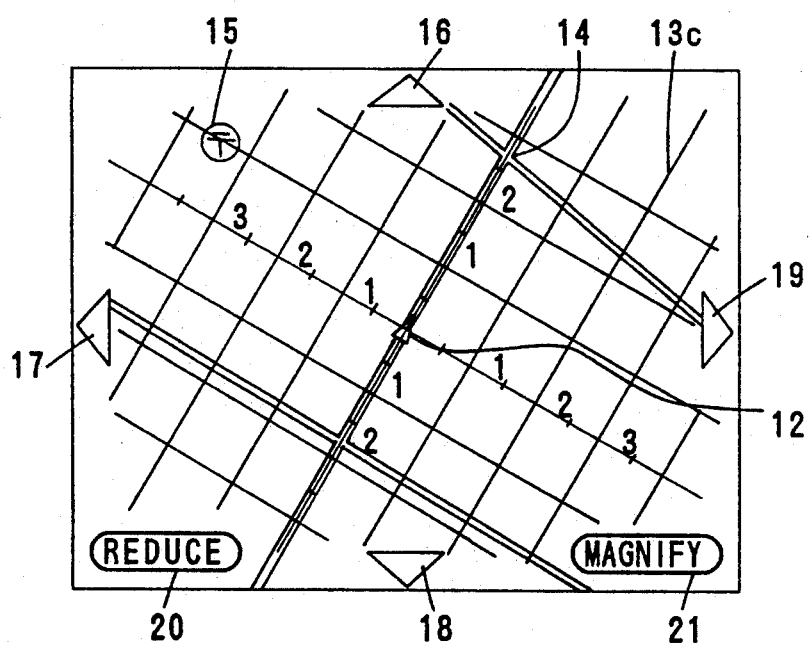

VEHICLE-MOUNTED NAVIGATION APPARATUS

BACKGROUND OF THE INVENTION

1. Field of the Invention

This invention relates to a navigation apparatus mounted on a vehicle for indicating the current position thereof on a reduced-scale road map which is displayed on a screen together with a measuring scale corresponding to the reduced scale thereof.

2. Description of the Prior Art

Conventionally various navigation apparatii to be mounted on a vehicle for indicating the current position thereof on a road map bearing a reduced scale displayed on a screen have been disclosed, a case in point being one disclosed in Japanese Patent Laid-Open No. 62-164086, whose construction is shown in a block diagram in FIG. 6.

In FIG. 6, reference numeral 30 denotes an azimuth sensor adopting an earth magnetism sensor for detecting the absolute direction in which the vehicle is heading for, and reference numeral 31 denotes another azimuth sensor adopting an optical gyro sensor for detecting the relative azimuth. Numeral 32 denotes a speed pulse sensor for generating repetitive pulses in accordance with the speed of the vehicle, and numeral 33 denotes an operation switch for the driver to specify a road map to be displayed and so forth. An external storage means 34 stores various road maps, and the amplifier 36 amplifies an audio signal representing a crossroads, a building and so forth received from a microprocessor 29 and informs it to the driver by way of a speaker 37. Further, the microprocessor 29 receives signals from the azimuth sensors 30, 31, the speed pulse sensor 32 and from the operation switch 33, and controls the external storage 34 and the amplifier 36, and then generates a display signal, whereby the display unit 35 displays in accordance with the signal fed from the microprocessor 29.

Operation of the vehicle-mounted navigation apparatus constructed as above is now described. The pulse received from the speed pulse sensor 32 is accumulated in the microprocessor 29 so as to calculate the travel distance of the vehicle, and by the thus calculated travel distance data and running direction data generated from the azimuth sensors 30 and 31, the current position of the vehicle is detected. The microprocessor 29 thereafter reads road maps, various running conditions such as crossroads, buildings and so on, and also distance data representing a real travel distance per predetermined length on a selected road map from the external storage means 34, and then displays on the screen of the display unit 35.

By this operation above, a current vehicle position indicating mark 12 is indicated at a predetermined location on the road map displayed on the screen of the display unit 35 as shown in FIG. 7, and the real distance is calculated from the scale indication pattern 13d showing a real distance of a predetermined length on the road map displayed on the screen of the display unit, whereby the driver can conceive the real running distance heading for targets such as a crossroads, post office and so forth.

However, since the conventional vehicle-mounted navigation apparatus is constructed as above, the distance data represented by a measuring scale showing the reduced scale of a road map is displayed only at a predetermined location on the road map, so that it is not very effective for detecting a distance, for example, to the crossroads 14 from the current position of the vehicle, and therefore it is not easy for the driver to obtain the distance at only one glance.

SUMMARY OF THE INVENTION

The present invention has been made to eliminate such problems as described above, and it is an object of the present invention to provide a vehicle-mounted navigation apparatus capable of switching from a measuring scale corresponding to the reduced scale of the road map to another and displaying it in accordance with a requirement of the driver.

The vehicle-mounted navigation apparatus according to the present invention comprises a map data storage means for storing a plurality of road map data concerning the road maps with different reduced scales, a scale indication pattern storage means for storing a plurality of scale indication patterns showing the respective reduced scales corresponding to the stored road maps, a scale indication switching means for switching scale indication patterns stored in the scale indication pattern storage means from one to another, and a display control unit for controlling the displayed image by superimposing the scale indication pattern from the scale indication pattern storage means on the road map selected from the map data storage means and displayed on the screen of the display unit in accordance with the detected data concerning the current position of the vehicle.

The display control unit according to the present invention, first reads a plurality of road map data having different reduced scales from the map data storage means and displays a road map on the screen of the display unit selected in accordance with a control signal from a touch panel unit, and then reads a scale indication pattern from the scale indication pattern storage means in accordance with a switching operation of the scale indication switching means, so that the selected scale indication pattern is superimposed on the road map already displayed on the screen of the display unit.

Other objects and features of the invention will be more fully understood from the following detailed description and appended claims when taken with the accompanying drawings.

BRIEF DESCRIPTION OF THE DRAWINGS

FIG. 4 is an explanatory view showing further example of a displayed image on the display unit in the embodiment shown in FIG. 1;

DETAILED DESCRIPTION OF THE PREFERRED EMBODIMENTS

In the following, a vehicle-mounted navigation apparatus according to the present invention is described with reference to the accompanying drawings.

Figure 1:
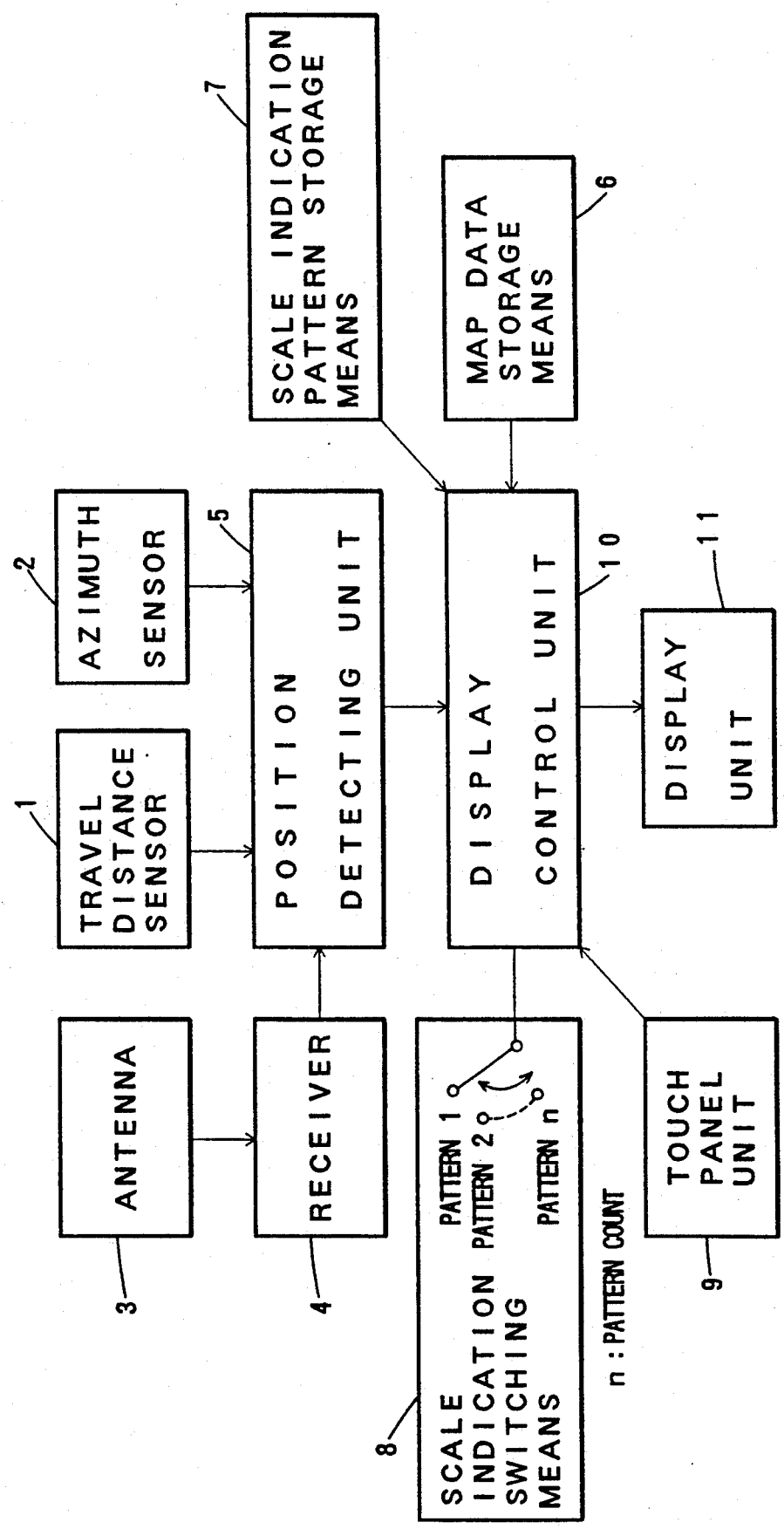
FIG. 1 is a diagrammatic representation of an entire construction of a vehicle-mounted navigation apparatus showing an embodiment of the present invention.

Referring to FIG. 1 showing an entire construction of an embodiment of the present invention, reference numeral 1 denotes a travel distance sensor for detecting the travel distance of the vehicle, reference numeral 2 denotes a azimuth sensor for detecting the running direction of the vehicle, numeral 3 denotes an antenna for externally receiving data concerning the current location of the vehicle, and reference numeral 4 denotes a receiver which is connected to the antenna 3 composing a receiving means together with the antenna.

Further, a position detecting unit 5 receives signals from the travel distance sensor, the azimuth sensor and from the receiver 4 so as to detect the current position of the vehicle, and then outputs to the screen of a display control unit 10.

A map data storage means 6 stores road map data concerning a plurality of road maps each having different reduction of scale, and the display control unit 10 reads the stored data, and further a plurality of scale indication patterns showing the respective reduced scales corresponding to the road maps are stored in a scale indication pattern storage means 7, so that each of these scale indication patterns is read from the display control unit 10 to be displayed.

On the other hand, reference numeral 8 denotes a scale indication switching means for switching the scale indication patterns stored in the scale indication pattern storage means 7 from one scale pattern to another, reference numeral 9 denotes a touch panel unit for sending a control signal when the driver operates switch patterns located on the screen, and reference numeral 11 denotes a display unit.

The display control unit 10 reads road map data concerning the road maps from the map data storage means 6 in accordance with the current position of the vehicle detected by the position detecting unit 5, and further specifies the road map to be displayed on the screen of the display unit in accordance with a control signal from the touch panel unit 9, and also reads a scale indication pattern from the scale indication pattern storage means 7 in accordance with a switching operation of the scale indication switching means 8, thereafter a display signal is outputted to the display unit 11, so that the selected scale indication pattern is superimposed on the road map on the screen.

Figure 2:
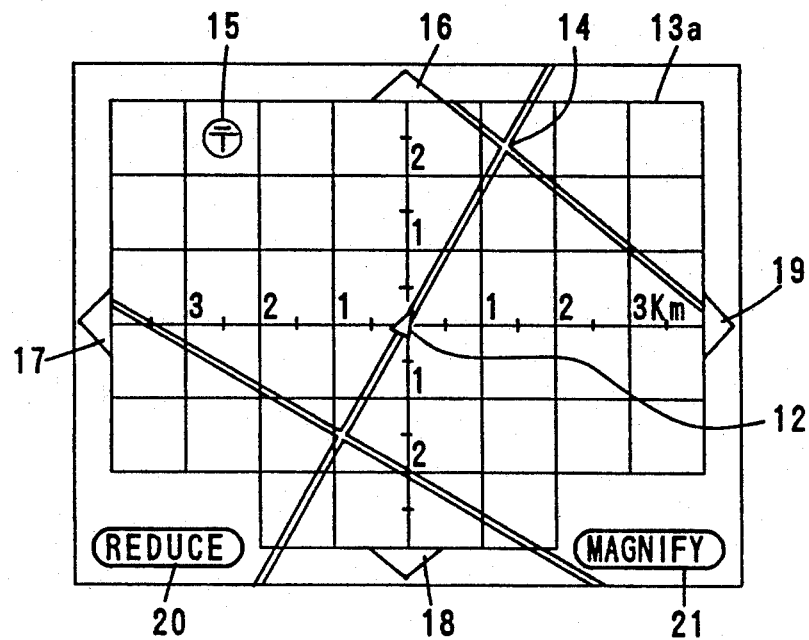
FIG. 2 is an explanatory view showing an example of a displayed image on the screen of a display unit in the embodiment shown in FIG. 1.
Figure 3:
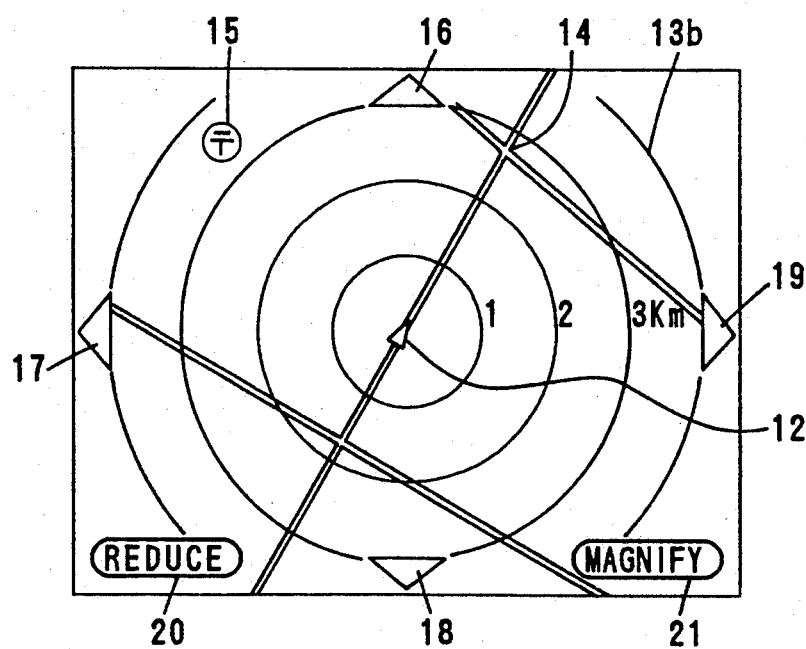
FIG. 3 is an explanatory view showing another example of a displayed image on the display unit in the embodiment shown in FIG. 1.
Figure 5:
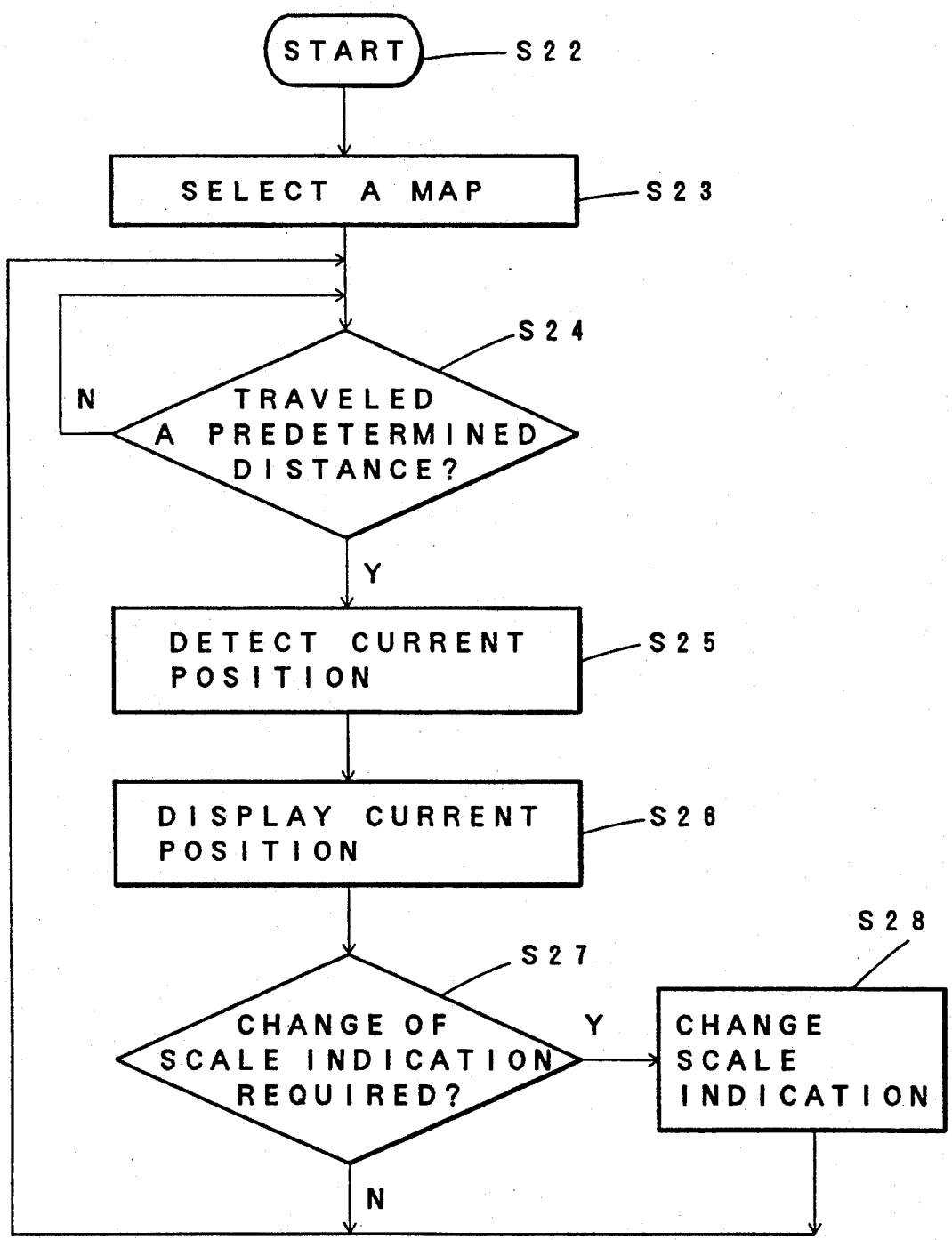
FIG. 5 is a flowchart showing an operation procedure of the embodiment shown in FIG. 1.
Figure 6:
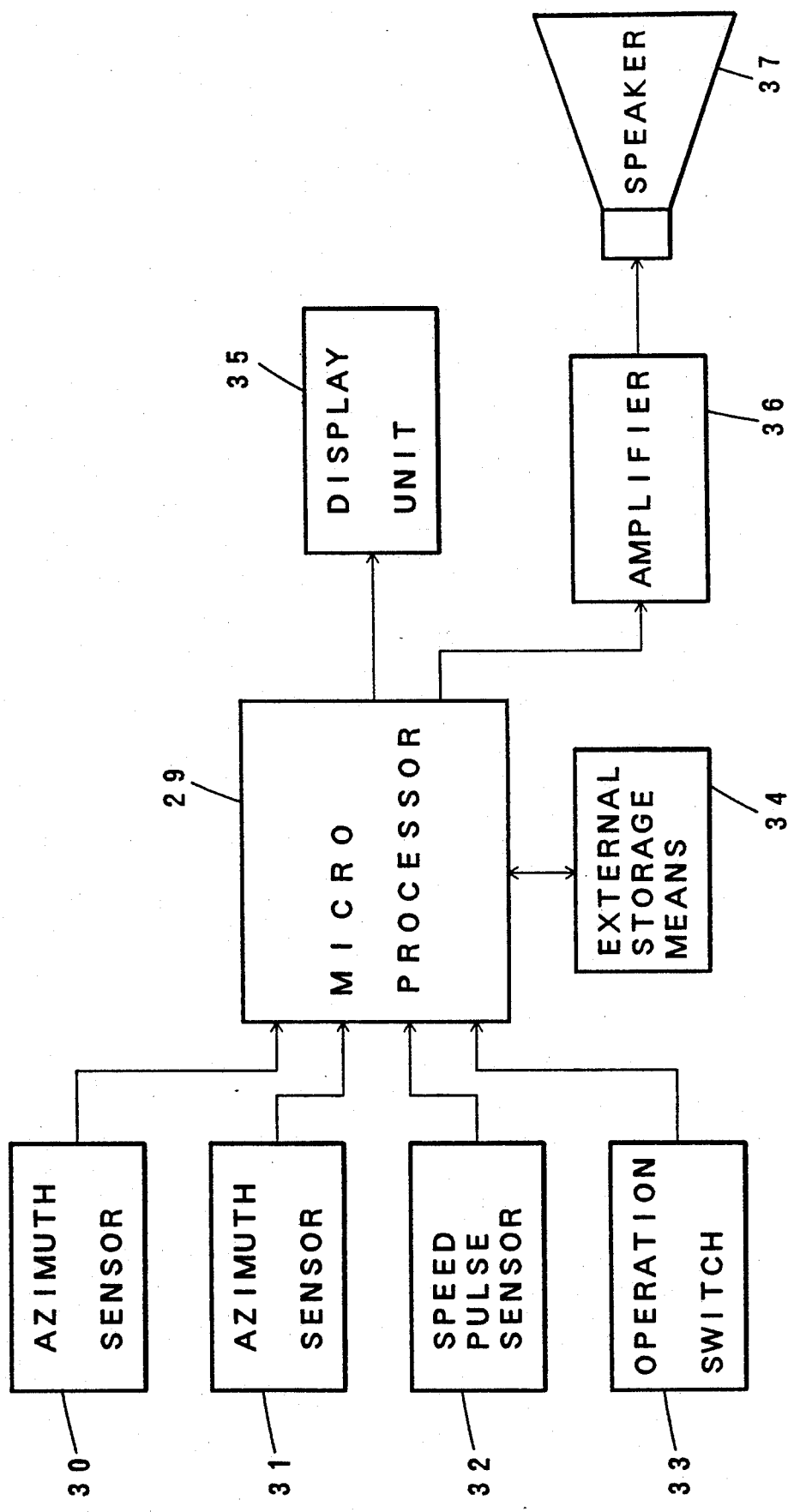
FIG. 6 is a diagrammatic representation of an entire construction of a conventional vehicle-mounted navigation apparatus.

Operation of the vehicle-mounted navigation apparatus according to the present invention is now described referring to FIGS. 2 to 4, and the flowchart of FIG. 5

FIGS. 2, 3 and 4 respectively show examples of displayed images embodied by the present invention, and in each figure, reference numeral 12 denotes a current position indicating mark showing the current position of the vehicle and the running direction thereof, reference numeral 14 denotes the next crossroads on the road on which the vehicle is running, numeral 15 denotes a landmark for the driver such as a post office, numerals 16 to 21 respectively denote switch patterns connected to the touch panel unit 9, each of which sends a control signal in accordance with a predetermined function when operated.

By the way, the switch patterns 16 to 19 generate respective control signals for scrolling the maps to be displayed, wherein the switch pattern 16 scrolls the map upwards, the switch pattern 17 scrolls to the left, the switch pattern 18 scrolls downwards and the switch pattern 19 to the right. The switch patterns 20 and 21 respectively generate control signals for displaying the map with different reduction of scale, wherein the switch pattern 20 generates a control signal to display the map with a reduced scale so as to display a wider range, while the switch pattern 21 generates a control signal to display the map with an expanded scale so as to display a narrower range.

On the other hand, reference numerals 13a to 13c respectively denote respective scale indication patterns, wherein the scale indication pattern 13a is a lattice like pattern wherein one of the points at which two lines intersect with each other is superimposed on the current position of the vehicle, and also each line of the lattice is located in parallel with the horizontal and vertical lines of the screen frame of the display unit. The scale indication pattern 13b is a concentric circle pattern whose center point is superimposed on the current position of the vehicle, and the scale indication pattern 13c is a lattice like pattern wherein one of the points at which two lines are intersecting with each other is superimposed on the current position of the vehicle and one of the lines of the lattice is located in parallel with the direction in which the vehicle is heading for.

The flowchart shown in FIG. 5 represents an operation of the vehicle-mounted navigation apparatus according to the present invention, wherein the procedure for processing the operation starts in step 22, and thereafter the driver sets a map with a desired reduction of scale on the screen of the display unit by operating the switch patterns 20 and 21. Whereafter the procedure advances to step 24 where it is judged whether the vehicle has traveled a predetermined distance (for example 5 meters) in accordance with a signal from the travel distance sensor 1, and if the judgment is negative, the same procedure is repeated until the predetermined distance is completed, and when it is completed, the procedure advances to step 25 where the position detecting unit 5 detects the current position of the vehicle by output position data from the receiver 4 such as a GPS receiver for receiving signals from the worldwide positioning system (Global Positioning System) or a beacon receiver for receiving a weak radio wave outputted from a beacon post disposed on a road, or by travel distance data fed from the travel distance sensor 1 and azimuth data fed from the azimuth sensor 2 in case the conditions are not conductive to obtaining the position data from the receiver. In the following step 26, the display control unit 10 reads map data from the map data storage means 6 as occasion demands in accordance with the data concerning the current position of the vehicle obtained in the previous step 25, and sends a display signal to the display unit 11. In the following step 27, the display control unit judges whether the scale indication switching means 8 has been operated to switch from one pattern to another, and if the judgment is negative, the procedure advances to step 24, but in case it is judged that the scale indication switching means has been operated, then the procedure advances to step 28 where the display control unit 10 reads the scale indication pattern corresponding to the result of the operation of the scale indication switching means 8 from the scale indication pattern storage means 7 and displays it on the screen of the display unit, and thereafter the procedure returns to step 24 to repeat the same procedure.

Figure 7:
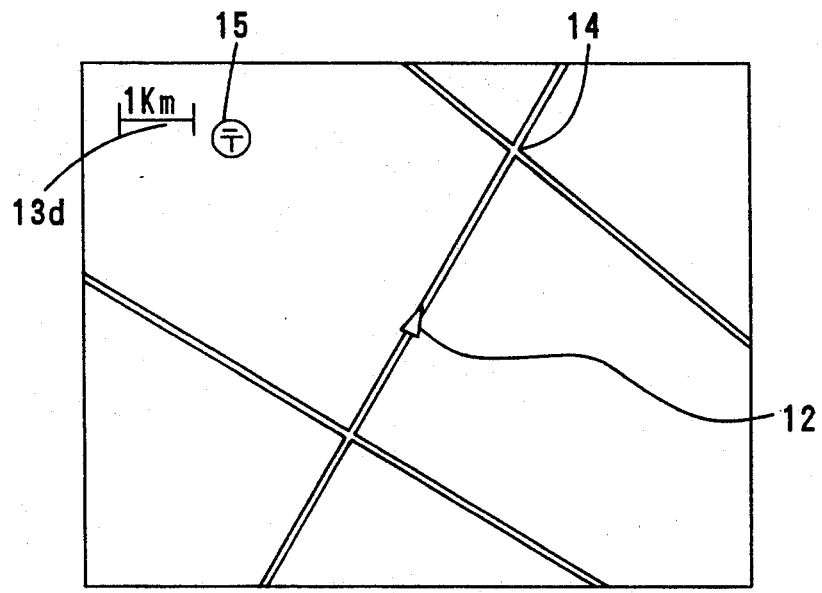
FIG. 7 is an explanatory view showing an example of a displayed image on the display unit of the conventional vehicle-mounted navigation apparatus shown in FIG. 6.

By the way, although three scale patterns are shown in respective FIGS. 2, 3 and 4 in the above embodiment of the present invention, a conventionally used scale pattern as shown in FIG. 7 can be used by the scale pattern switching operation as a matter of fact, and further, deletion of a scale indication can also be used as one of the scale indication patterns.

In summary, according to the present invention, the display control unit reads road map data from the map data storage means in accordance with the data concerning the current position of the vehicle and controls display image to be displayed on the screen of the display unit in accordance with a control signal from the touch panel unit, reads a scale indication pattern from the scale indication pattern storage means in accordance with the switching operation of the scale indication switching means so as to superimpose the selected scale pattern on the road map displayed on the screen, whereby a map with a desired reduction of scale with a desired scale indication pattern corresponding to the scale reduction of the map superimposed thereon can be displayed.

By the construction above, the driver can readily obtain a map with a desired reduction of scale and a scale pattern corresponding to the reduction of scale on the screen, and thereby detection of the real distance can be readily and correctly performed, ensuring a smooth and safe cruising of the vehicle.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A navigation apparatus mounted on a vehicle for indicating a current position of the vehicle on a screen of a display unit disposed therein, said navigation apparatus comprising:

a travel distance sensor for detecting distance traveled by the vehicle;

an azimuth sensor for detecting a running direction of the vehicle;

receiving means for externally receiving information concerning location of the vehicle, said receiving means including an antenna and a receiver;

position detecting means for detecting a current position of the vehicle from data collected from said travel distance sensor, said azimuth sensor, and said receiving means;

map data storage means for storing data corresponding to a plurality of road maps, each road map having a different scale;

scale indication pattern storage means for storing a plurality of scale indication patterns showing respective reduced scales corresponding to the stored road maps;

scale indication switching means for selecting one of said scale indication patterns stored in said scale indication pattern storage means;

a touch panel unit for generating a control signal for specifying an image to be displayed on the screen; and a display control unit which reads said data from said map data storage means corresponding to one of said road maps in accordance with the current position of the vehicle detected by said position detecting unit, controls the read data to be displayed on the screen of the display unit in accordance with said control signal from said touch panel unit, and further reads the selected scale indication pattern from said indication pattern storage means in accordance with the selection operation of said scale indication switching means, thereby superimposing the selected scale indication pattern on the displayed road map.

2. The navigation apparatus as claimed in claim 1, wherein said touch panel unit corresponds to various switch patterns which are indicated on the screen for controlling the road map data read from said map data storage means.

3. The navigation apparatus as claimed in claim 1, wherein one of said scale indication patterns is a lattice pattern, a crossing of intersecting lines of the lattice pattern being superimposed on the current position of the vehicle, said intersecting lines being parallel with horizontal and vertical lines of a screen frame of said display unit.

4. The navigation apparatus as claimed in claim 1, wherein one of said scale indication patterns is a concentric circle pattern with a center point thereof superimposed on the current position of the vehicle.

5. The navigation apparatus as claimed in claim 1, wherein one of said scale indication patterns is a lattice pattern, a crossing of intersecting lines of the lattice pattern being superimposed on the current position of the vehicle, one of the lines of the lattice pattern being parallel with a direction for which the vehicle is heading.

6. A method for indicating a current position of a vehicle on a screen of a display unit disposed therein, said method comprising the steps of:

(a) detecting distance traveled by the vehicle;

(b) detecting a running direction of the vehicle;

(c) externally receiving information concerning location of the vehicle through an antenna and a receiver;

(d) detecting a current position of the vehicle from data collected in said steps (a), (b), and (c);

(e) storing data corresponding to a plurality of road maps, each road map having a different scale;

(f) storing a plurality of scale indication patterns showing respective reduced scales corresponding to the stored road maps;

(g) selecting one of the stored scale indication patterns;

(h) generating a control signal for specifying an image to be displayed on the screen;

(i) reading the data corresponding to one of the stored road maps in accordance with the current position of the vehicle;

(j) displaying on a screen of the display unit the one road map in accordance with the control signal generated in said step (h);

(k) reading the selected stored scale indication pattern in accordance with the selection operation of said step (g), thereby superimposing the selected scale indication pattern on the displayed road map.

7. The method as claimed in claim 6, wherein one of the scale indication patterns is a lattice pattern, a crossing of intersecting lines of the lattice pattern being superimposed on the current position of the vehicle, the intersecting lines being parallel with horizontal and vertical lines of a screen frame of the display unit.

8. The method as claimed in claim 6, wherein one of the scale indication patterns is a concentric circle pattern with a center point thereof superimposed on the current position of the vehicle.

9. The method as claimed in claim 6, wherein one of the scale indication patterns is a lattice pattern, a crossing of intersecting lines of the lattice pattern being superimposed on the current position of the vehicle, one of the lines of the lattice pattern being parallel with a direction for which the vehicle is heading.

* * * * *